(12) United States Patent
Puskas et al.

(10) Patent No.: US 7,614,349 B2
(45) Date of Patent: Nov. 10, 2009

(54) LESS-LETHAL AMMUNITION PROJECTILE

(75) Inventors: Judit E. Puskas, Akron, OH (US); Amer Ebied, London (CA); Barry Lamperd, Sarnia (CA); Bhuwneesh Kumar, London (CA)

(73) Assignee: The University of Western Ontario, London, ON (CA)

( * ) Notice: Subject to any disclaimer, the term of this patent is extended or adjusted under 35 U.S.C. 154(b) by 109 days.

(21) Appl. No.: 10/574,268

(22) PCT Filed: Oct. 4, 2004

(86) PCT No.: PCT/CA2004/001773
§ 371 (c)(1),
(2), (4) Date: Feb. 15, 2007

(87) PCT Pub. No.: WO2005/031246
PCT Pub. Date: Apr. 7, 2005

(65) Prior Publication Data
US 2007/0234891 A1    Oct. 11, 2007

Related U.S. Application Data

(60) Provisional application No. 60/507,491, filed on Oct. 2, 2003.

(51) Int. Cl.
*F42B 8/12* (2006.01)
*F42B 30/00* (2006.01)

(52) U.S. Cl. .................................. 102/517; 102/502

(58) Field of Classification Search .............. 102/516, 102/517, 518, 439, 444, 498, 502, 529
See application file for complete search history.

(56) References Cited

U.S. PATENT DOCUMENTS

| 3,046,890 A | * | 7/1962 | Dardick | ............... 102/434 |
| 3,125,924 A | * | 3/1964 | Mayer et al. | ............... 86/11 |
| 3,242,789 A | * | 3/1966 | Woodring | ............... 86/11 |

(Continued)

FOREIGN PATENT DOCUMENTS

EP    0 641 836 A2    3/1995

(Continued)

OTHER PUBLICATIONS

Kim, Jeong H. et al., Improvement in the mechanical properties of multicomponent polymer blends using dual compatibilizers, Polymer Science & Eng 2001, vol. 85, p. 346-347.

*Primary Examiner*—Bret Hayes
(74) *Attorney, Agent, or Firm*—Lynn C. Schumacher; Hill & Schumacher

(57) ABSTRACT

A high-density composite material and its use in the manufacture of less-lethal ammunition projectile is disclosed. The composite ammunition projectile material is produced from a compact mixture of fine iron powder, a highly damping, inert, non-toxic elastomer and an inert non-toxic thermoplastic elastomer. The composite ammunition projectile material is first blended, then the projectile is injection molded or compression molded. The density of the composite ammunition projectile material is adjustable in terms of ratio of iron powder to elastomer to thermoplastic elastomer block co-polymer, but a minimum density of $2.4\ \text{gcm}^{-3}$ is preferred. A blend comprising an elastomer and a thermoplastic elastomer with low creep is also disclosed.

26 Claims, 7 Drawing Sheets

U.S. PATENT DOCUMENTS

| | | | | |
|---|---|---|---|---|
| 4,734,329 | A | * | 3/1988 | Rudd et al. .................. 428/383 |
| 4,748,064 | A | * | 5/1988 | Harpell et al. ............... 428/113 |
| 5,343,796 | A | * | 9/1994 | Cordova et al. ............ 89/36.02 |
| 5,591,933 | A | * | 1/1997 | Li et al. ..................... 89/36.02 |
| 5,786,416 | A | * | 7/1998 | Gardner et al. .............. 524/440 |
| 6,003,424 | A | * | 12/1999 | Cordova et al. ............ 89/36.02 |
| 6,012,395 | A | * | 1/2000 | Saxby ........................ 102/502 |
| 7,207,274 | B1 | * | 4/2007 | Plew et al. .................. 102/501 |

FOREIGN PATENT DOCUMENTS

| | | |
|---|---|---|
| EP | 1067164 A1 | 1/2001 |
| WO | WO 01/42343 A1 | 6/2001 |
| WO | WO 02/085953 A2 | 10/2002 |

\* cited by examiner

Linear Triblock     Triarm Star-Block     Multiarm Star-Block

Arborescent Block

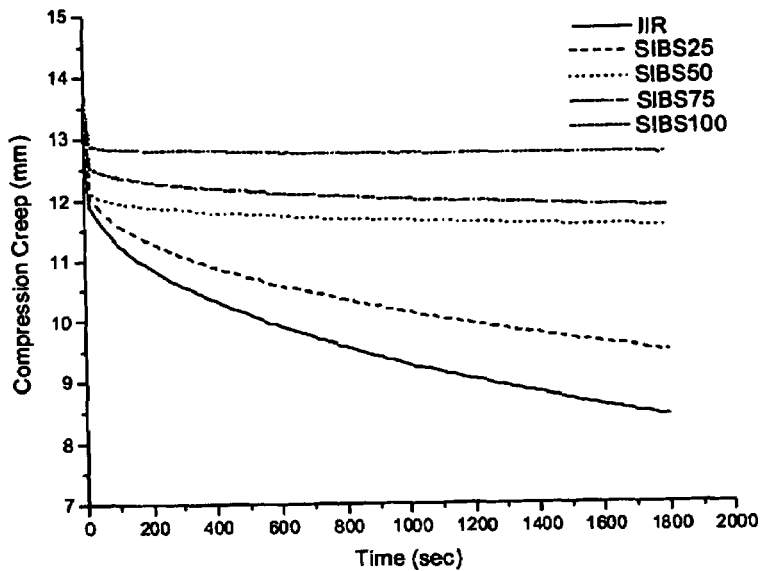
FIGURE 2: Compression creep of IIR/Iron, IIR/SIBS/Iron, and SIBS/Iron blends.
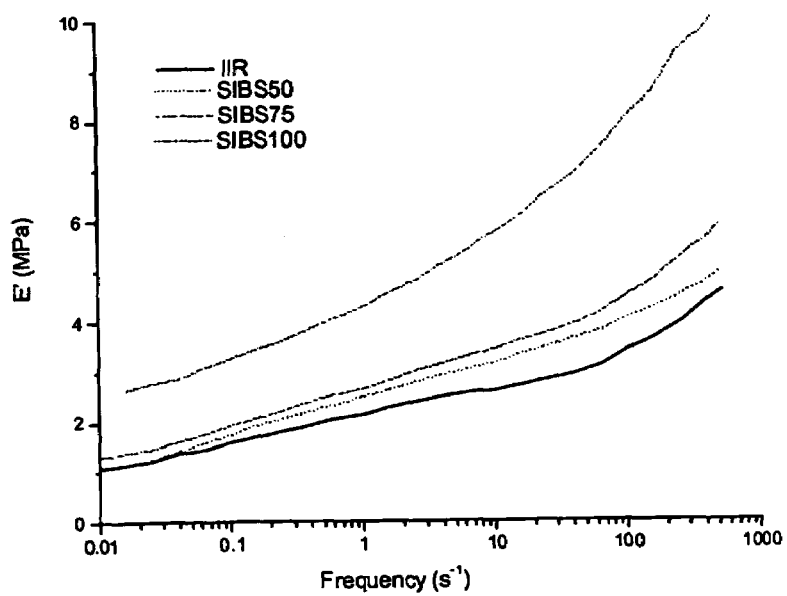
FIGURE 3: Storage moduli plots of IIR/SIBS/Iron blends at 50 $^{0}$C

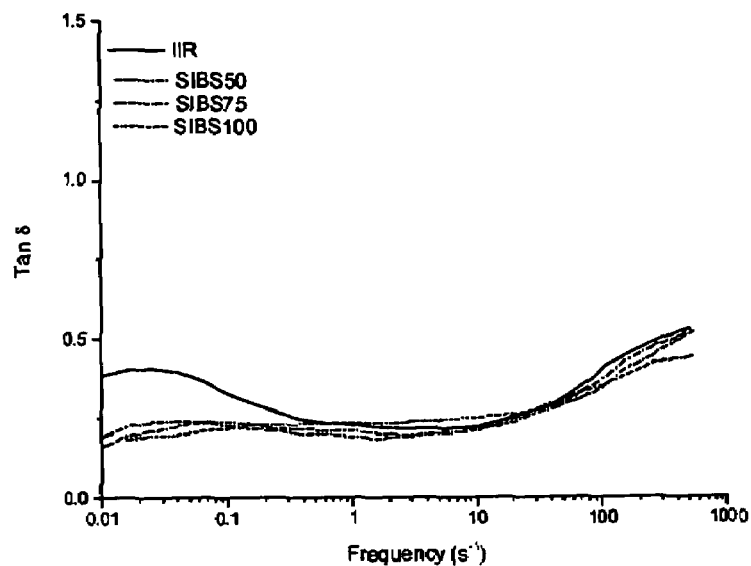
FIGURE 4: Tan delta plots of IIR/SIBS/Iron blends at 50 °C.
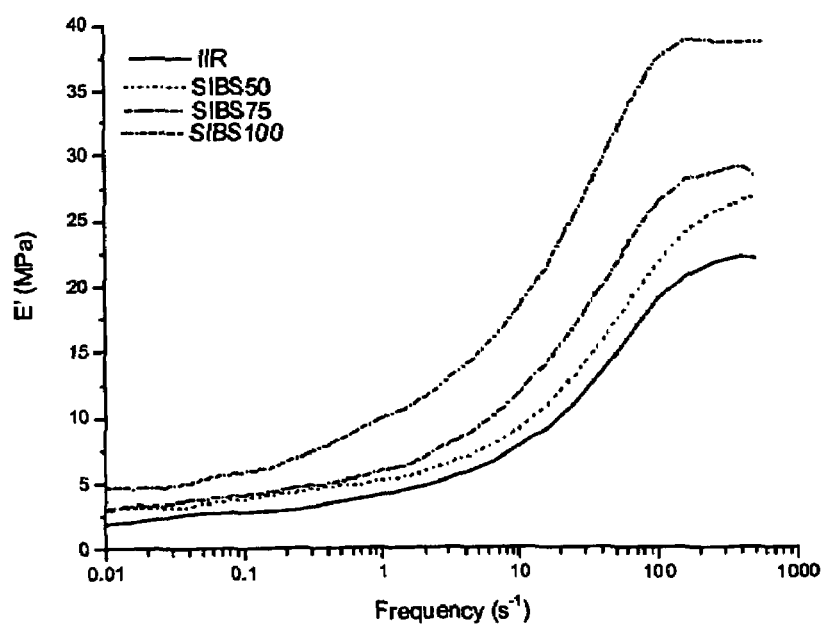
FIGURE 5: Storage moduli plots of IIR/SIBS/Iron blends at 0 °C

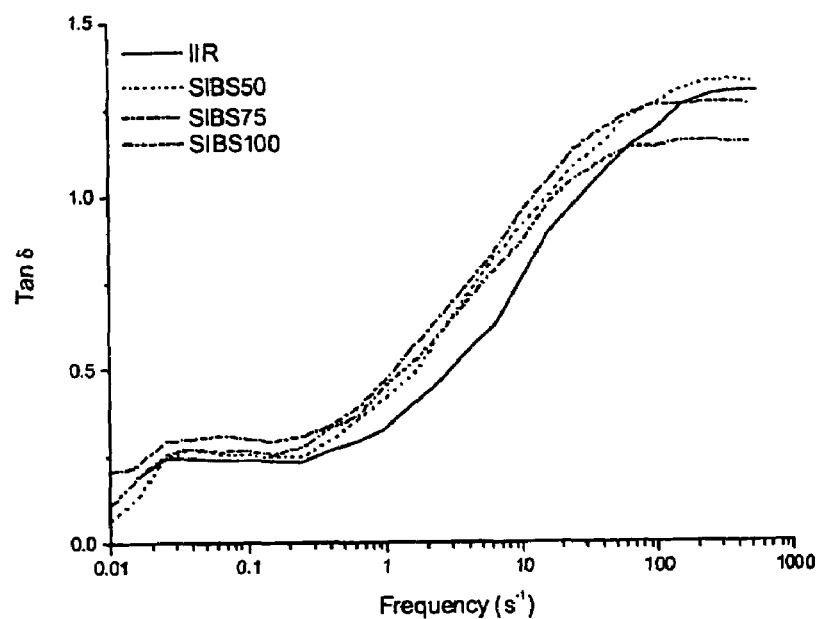
FIGURE 6: Tan delta plots of IIR/SIBS/Iron blends at 0 °C
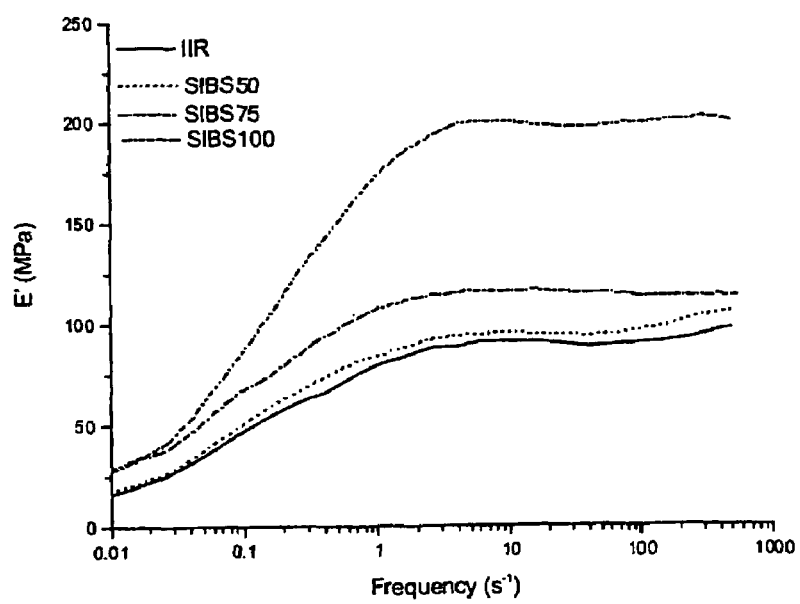
FIGURE 7: Storage moduli plots of IIR/SIBS/Iron blends at -50 °C

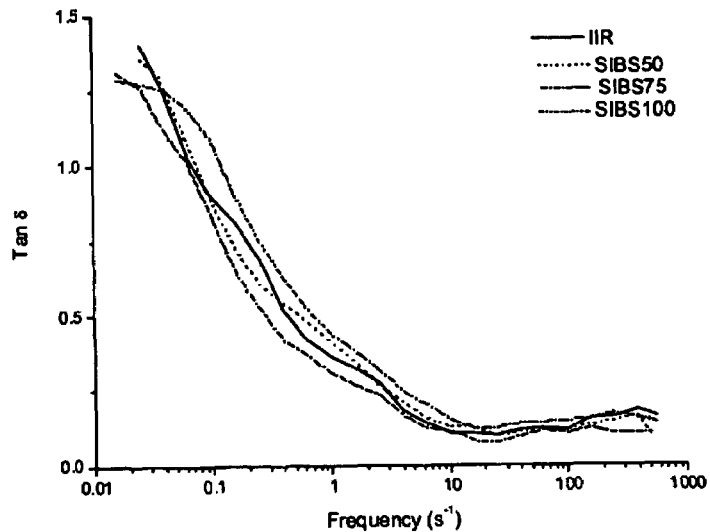
FIGURE 8: Tan delta plots of IIR/SIBS/Iron blends at -50 °C
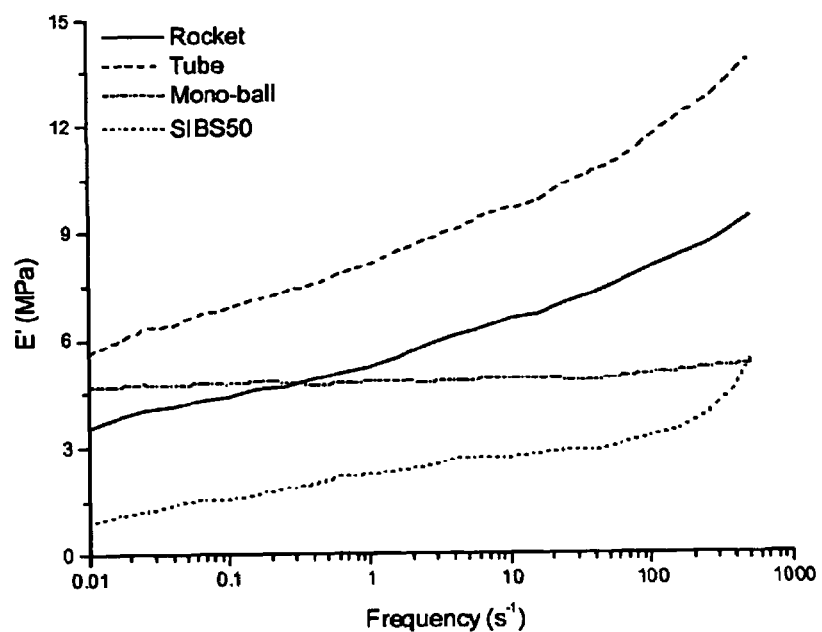
FIGURE 9: Comparison of the storage moduli plots of existing less–lethal ammunition projectiles and SIBS50 at 50 °C.

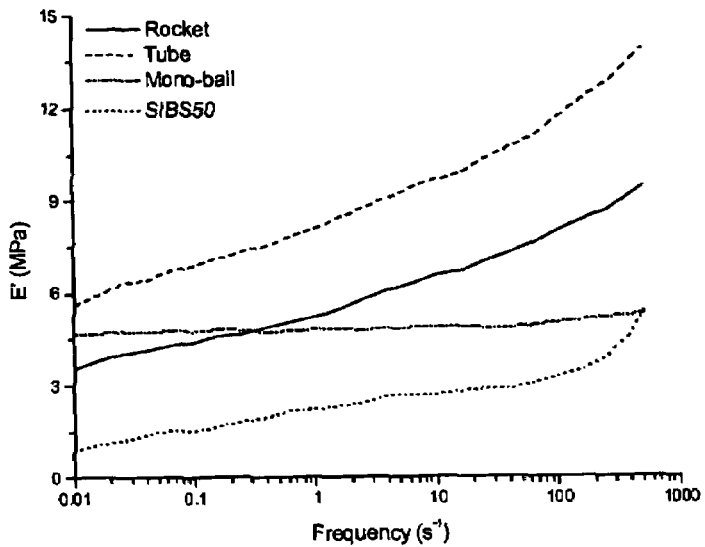
FIGURE 10: Comparison of the tan delta plots of existing less-lethal ammunition projectiles and SIBS50 at 50 °C.
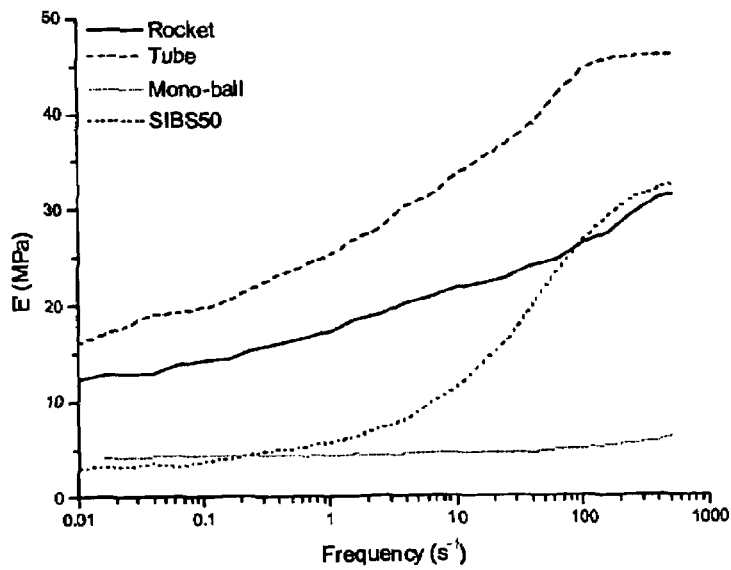
FIGURE 11: Comparison of the storage moduli plots of existing less-lethal ammunition projectiles and SIBS50 at 50 °C.

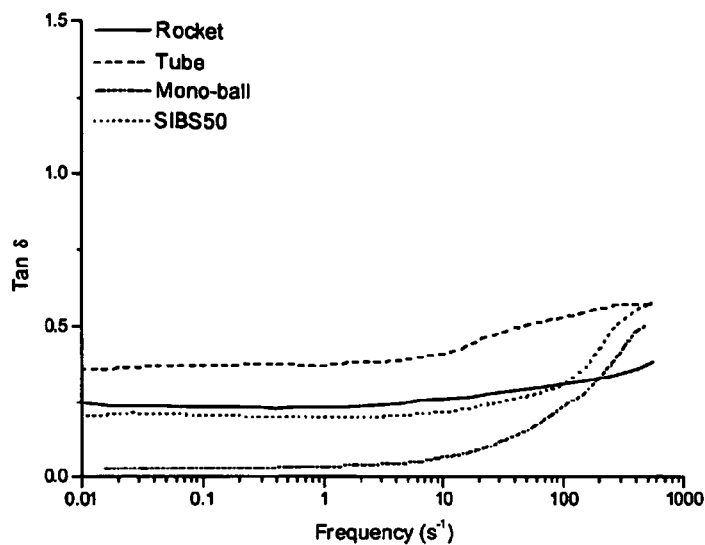
FIGURE 12: Comparison of the tan delta plots of existing less–lethal ammunition projectiles and SIBS50 at 50 °C.
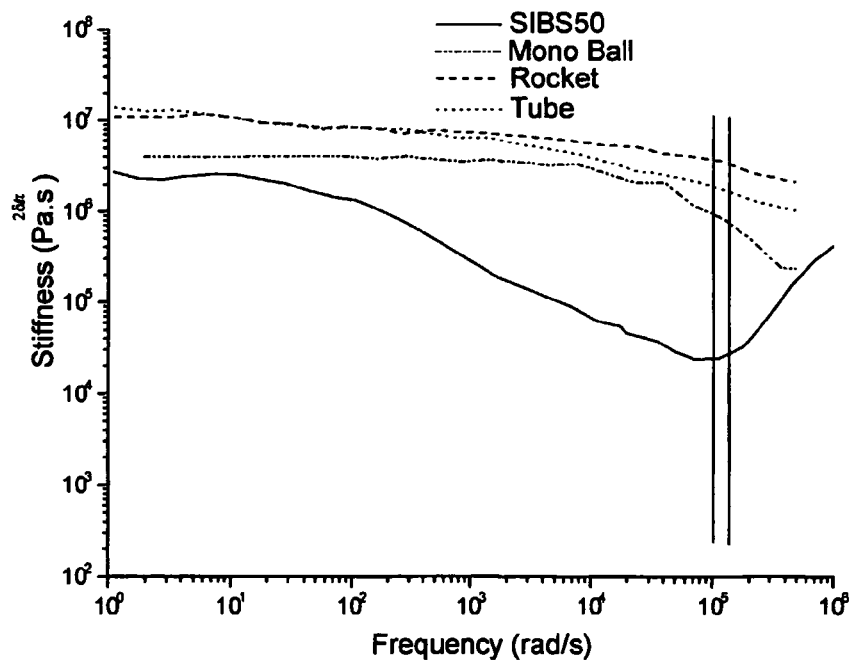
FIGURE 13: Comparison of the dynamic frequency plots of existing less–lethal ammunition projectiles and SIBS50 ated U.S.  
LESS-LETHAL AMMUNITION PROJECTILE

CROSS REFERENCE TO RELATED U.S. APPLICATION

This patent application is a National Phase application claiming the benefit of PCT/CA2004/001773 filed on Oct. 4, 2004; which further claims the priority benefit from, U.S. Provisional Patent Application Ser. No. 60/507,491 filed on Oct. 2, 2003 which is incorporated herein in its entirety.

FIELD OF THE INVENTION

The present invention relates to polymeric-based non-lethal ammunition which may be used for the purpose of crowd control or by special task forces, e.g. SWAT teams and/or air marshals. More particularly the present invention relates to a composite material, which is a thermoplastic elastomer (TPE)-elastomer blend exhibiting shape retention. Adding a higher density constituent to increase the density gives a composite useful for non-lethal ammunition.

BACKGROUND OF THE INVENTION

In many types of confrontational situations, the use of lethal ammunition is not appropriate. More and more law enforcement and military authorities are seeking ways to reduce casualties in confrontation situations, particularly crowd control and in hostage situations, which are handled by special task forces, e.g. SWAT teams and air marshals. Different available less-lethal devices have been evaluated and categorized in terms of their effectiveness and potential in the context of law enforcement ("Less Lethal Technologies—Initial Prioritisation and Evaluation," by T. Donnelley, Home Office, PSDB No. 12/01, Police Scientific Development Branch, Hertfordshire, United Kingdom (2002)"—with permission to quote). In this report, the impact type of less-lethal ammunition projectiles were placed in Category A, i.e. those devices meriting immediate further research. Examples of less-lethal ammunition projectiles given were bean bags, sock rounds, single and multiple ball rounds, fin stabilized rubber projectiles, single and multiple baton rounds and encapsulated rounds.

Fin stabilized rubber projectiles (referred to as the Rocket) are made of thermoset elastomers, for example EPDM (Ethylene-Propylene-Diene rubber). One specific sample analyzed was made of filled thermoset EPDM and was measured to have a density of 1.4 gcm$^{-3}$, and Shore A Hardness (ASTM D2240) of 62. The fin stabilization improves the accuracy at long ranges. These projectiles are generally fired from a 12-gauge shotgun or compressed gas weapon and the typical range is up to 45 m. Drawbacks associated with these types of projectiles are their high fabrication cost and very small tolerances in the design dimensions. In addition, under cold climatic conditions (<0° C.) these projectiles "freeze' i.e., become hard, and as a result can be lethal if for example they hit a person in the head or temple.

Another type of non-lethal ammunition, namely tail stabilized lead filled rubber projectiles (Tube) consist of a cylindrical envelope made of thermoset rubbers, for example EPDM or SBR (styrene-butadiene rubber). The core of the projectile is filled with lead pellets. The tail is attached to the projectile for stabilization, which improves its accuracy. One specific example analyzed was made of an SBR shell filled with lead pellets, and was measured to have a total density of about 4.1 gcm$^{-3}$, with the density and Shore A hardness of the rubber shell being 1.2 gcm$^{-3}$, and 62, respectively. These projectiles are generally fired from a 12-gauge weapon and the typical range is 5-30 m, depending on the model and type of weapon used. Drawbacks associated with these types of projectiles are their high fabrication cost, presence of lead and their 'lethality' under cold climatic conditions.

Another type of non-lethal ammunition, mono-ball rounds, consists of single rubber balls which are delivered over a short range. They are made of thermoset rubber, e.g., natural rubber, filled with mineral fillers, e.g., calcium carbonate. One specific example analyzed was made of filled thermoset polyisoprene (synthetic or natural) and was measured to have a density of 1.11 gcm$^{-3}$ and Shore A Hardness of 46. Drawbacks associated with these projectiles include little or no accuracy. These projectiles are generally fired from a 37 mm weapon, which most police and military personnel find cumbersome to carry around.

Multi-ball rounds are another type of less-lethal impact projectiles which include multiple rubber balls delivered over a short range as these projectiles quickly loose their kinetic energy owing to their low mass. They are made of thermoset rubbers, e.g., natural rubber or SBR, filled with minerals, e.g., calcium carbonate or carbon black. One specific example analyzed was made of filled thermoset EPDM, and was measured to have a density of 1.1 gcm$^{-3}$, and Shore A hardness of 62. These projectiles are generally fired from a 12-gauge weapon but other calibers may also be found. The range of these projectiles depends on the diameter and number of balls, the caliber of the projectiles and the amount of propellant. Drawbacks associated with these projectiles are that like single ball rounds, these projectiles are indiscriminate hence have little or no accuracy.

Beanbag rounds are another type of non-lethal ammunition which consists of a square or circular envelope of fabric containing lead shots. The beanbag is generally fired from a 12-gauge weapon and flattens on impact, thereby spreading the energy over a large area. The typical range is 5-30 m, depending on the model and type of weapon used. For example, a 12 gauge round contains two 2-inch beanbags, each filled with 20 grams of #9 Lead. A few shortcomings associated with beanbag projectiles include inaccuracy, failure to open up and hitting the target edge on (i.e., "Frisbee effect"). In addition, the fabric may tear, causing environmentally toxic lead pellets to spill over the target and causing serious injuries. These are the most widely used less-lethal impact projectiles in North America and are associated with a few fatal incidents.

Sock rounds, another type of less-lethal impact projectiles, were developed to overcome the shortcomings associated with bean bag rounds. The sock round consists of a "sock" filled with lead pellets. A long tail is attached to the sock to enhance the stability of the projectile during flight. The problems associated with sock rounds are inaccuracy, tear of fabric and presence of environmentally toxic lead.

Powder filled rounds are less-lethal impact projectiles made of very soft, highly pliant silicone rubbers filled with metal powder. These projectiles expand radially upon impact thereby spreading their kinetic energy over a large area. The problem associated with these rounds is high cost.

Another type of less lethal ammunition is baton rounds which where first used by the police in Northern Ireland in 1973 and have steadily evolved over the years. They are made of polyurethane-based thermoplastics and have oIRHD (ASTM D1415) hardness in the range of 85 to 95 and mass in the range of 90 to 100 g. The most common commercially available rounds are L5A7 and L21A1.

One of the major concerns for law-enforcement agencies in using these less-lethal ammunition projectiles is the delicate balance between their effectiveness and their lethality. For example, the sock rounds, (i.e., fabric filled with lead pellets) and rubber projectiles (i.e., solid or filled with lead pellets) which are presently being used for crowd control, have been found to be lethal within a short range or causing serious injuries to vital organs. The fabric or thermoset elastomers used for the manufacture of these less-lethal projectiles require intricate design and fabrication, which enhances their cost. In addition, the presence of environmentally toxic lead results in serious health safety concerns among law enforcement agencies. Literature survey revealed that less lethal ammunition presently being used are either made of thermoplastics or thermoset-based carbon black/calcium carbonate filled composites. They reportedly are capable of inflicting lethal injuries when shot from a short distance or when shot at a vital organ (R. I. H. Whitlock and J. M. Gorman, Int. J. Oral Surg. 7, 240-245 (1978).).

Recently, Cynthia A Bir of Wayne State University, Michigan (Evaluation of Blunt ballistic impacts: The establishment of human response corridors. Bir C A; Vino D C; King A I, Proceedings of the Non-lethal Conference IV, Tysons Corner, Va. (2000); Ph. D. Thesis, 2000), has analyzed the effect of blunt ballistic impact on the thoracic region using human cadavers. She determined the human response corridors and developed biomechanical surrogates, which can be used for testing different new projectiles for their blunt ballistic impact. In addition, a 3-Rib Ballistic Impact Device (3-RBID) was developed to simulate the human response to low mass, high velocity impacts to the chest region. The human response force corridor for blunt thoracic impact for a 30 g projectile traveling at 60 ms$^{-1}$ (~200 fts$^{-1}$) was found to be in the range of 1800 N to 3800 N (400 lb$_f$ to 830 lb$_f$). Based on this work, in the present invention, the optimum weight and impact energy requirements for the new less lethal projectiles were applied for designing the new less lethal projectile. In addition, this invention also presents a new method to measure the impact energy of new and existing less lethal projectiles. This new method uses a viscoelastic material, namely polystyrene foam (Styrofoam Impactor) to measure the impact energy of less-lethal projectiles. Traditionally, clay or gel are used to measure the impact energy of lethal projectiles. These are also viscoelastic materials, but are very sensitive to environmental conditions such as moisture level and temperature so need to be conditioned before use. The traditional method has been adopted to test less-lethal ammunition as well but due to the low impact force of less lethal projectiles it is not very satisfactory for this purpose.

RELATED ART

As discussed above, the use of less-lethal projectiles is known. Such less-lethal ammunition are characterized by the use of fillers such as carbon black, calcium carbonate, iron powder, consolidated into a bullet having sufficient density for use in less-lethal ammunition. For example, Patent Application GB 2,192,258 discloses a less-lethal round comprising a projectile made of synthetic polyisoprene. Patent Application FR 2,532,742 discloses projectiles formed of an unspecified rubber bullet having a Shore A hardness of 40 to 55. Projectiles made of filled thermoplastic elastomers TPEs (ethylene-propylene copolymer, and styrene-isoprene-styrene SIS or styrene-butadiene-styrene SBS type) have been disclosed (J. C. Gardner, P. G. Gardner, I. P. Oliver and T. Peake, U.S. Pat. No. 5,786,419, Jul. 28, 1998, B. Dubocage and J. Mautcourt (to SNPE Paris Cedex), U.S. Pat. No. 6,295,933 B1, Oct. 2, 2001). All the composites mentioned above are based on either filled thermoset rubbers or filled thermoplastic elastomers or plastics; the fillers may include carbon black, calcium carbonate, metal powder or other minerals.

The composite material of the present invention is a blend of an elastomer, a thermoplastic elastomer, and a filler, which results in the unique properties of the less-lethal ammunition of this invention.

Therefore it would be very advantageous to provide a less lethal projectile using a material which can be produced using conventional polymer processing technology and which can be reused or recycled, and which would not cause serious injury.

SUMMARY OF THE INVENTION

An object of the present invention is to provide a low toxicity, low cost, high-density replacement material for developing novel less-lethal ammunition projectiles. This has been achieved in the present invention by using a composite material including a compacted mixture of fine metal powder, a thermoplastic block copolymer and an elastomer. Iron powder having a specific gravity of 7.8 grams per cubic centimeter (gm-cm$^{-3}$) and Brinell Hardness of 490 MNm$^{-2}$ cannot be matched with equivalent metals available at an affordable cost. The choice of this composite is the most economic approach to generate a replacement material to solid rubber or lead filled less-lethal ammunition currently available. This replacement material provides added value, such as significantly less toxicity and pollution, and is recyclable.

The present invention provides a composite material made of an elastomer, a thermoplastic elastomer and a filler, which is molded into a less lethal ammunition projectile using conventional polymer processing technology such as compression or injection moulding. The composition disclosed herein provides a highly damping polymer matrix, which is conducive to its use as a less-lethal projectile.

Nanostructured thermoplastic elastomers (TPEs) are emerging materials in the field of polymer science. These materials show processing behavior similar to that of thermoplastics and mechanical properties similar to that of thermoset elastomers or rubbers. Therefore they combine advantages of low fabrication cost and recyclability, i.e., similar to thermoplastics, and low hardness and elasticity i.e., similar to thermoset elastomers. Preliminary testing demonstrated that Polyisobutylene (PIB)-polystyrene (PS) based block copolymer TPEs, and butyl elastomer, with their inherent high damping properties would eminently be suitable for developing a composite for novel less lethal projectiles. Moreover, the exceptionally low temperature properties of these block copolymers together with ease of processing and recyclability, makes them suitable candidates. It is an objective of the present invention to provide a low toxicity, low cost, high-density replacement material for presently used less lethal projectile ammunition. This can be best achieved by using a compacted mixture of fine iron powder and of a blend of a thermoplastic elastomer and an elastomer. This replacement material provides added value, such as significantly less toxicity or pollutant. Since the elastomer phase is not chemically crosslinked, the composite can be recycled, but keeps its shape due to the presence of the TPE.

Accordingly, the present invention provides a polymer-based ammunition, comprising a composite material including a polymer matrix including at least one thermoplastic elastomeric polymer (TPE) component, and at least one soft elastomeric polymer component; particles of a sufficiently high specific gravity material that are dispersed in the polymer matrix and present in an amount such that the composite material has a specific gravity of in a range from about 2 to 3 grams per cubic centimeter; and the composite material having a shape of a pre-selected projectile.

Accordingly, the present invention provides a polymer-based ammunition, comprising a composite material including a polymer matrix including at least one thermoplastic elastomeric polymer (TPE) component, and at least one soft elastomeric polymer component that at ambient temperatures is above its glass transition temperature; particles of a sufficiently high specific gravity material that are dispersed in the polymer matrix and present in an amount such that the composite material has a specific gravity in a range from about 2 to 3 grams per cubic centimeter; and the composite material having a shape of a pre-selected projectile.

The composites thus prepared are subjected to a molding process, by which cylindrical bodies from the said composite, e.g. projectiles for firearms, etc., are manufactured by standard polymer processing techniques such as injection molding. The present invention also provides composite material, comprising: a polymer matrix including at least one thermoplastic elastomeric polymer (TPE) component, and at least one soft elastomeric polymer component that at ambient temperatures is above its glass transition temperature, the thermoplastic elastomeric polymer (TPE) component including a block copolymer having at least one elastomeric block, the material characterized in that it exhibits a dynamic mechanical compression creep below a threshold creep so that the composite material maintains its shape.

Further features and advantages of the present invention, as well as the structure and operation of various embodiments of the present invention, are described below in detail.

BRIEF DESCRIPTION OF DRAWINGS

The following is a description, by way of example only, of the new projectile, material properties of the composites constructed in accordance with the present invention, where IIR=butyl elastomer (isobutylene isoprene rubber); SIBS=polystyrene-block-polyisobutylene-block-polystyrene, reference being had to the accompanying drawings, in which:

FIG. 2 shows compression creep of IIR/SIBS/Iron blends;

FIG. 3 shows storage moduli plots of IIR/SIBS/Iron blends at 50° C.;

FIG. 4 shows tan delta plots of IIR/SIBS/Iron blends at 50° C.;

FIG. 5 shows storage moduli plots of IIR/SIBS/Iron blends at 0° C.;

FIG. 6 shows tan delta plots of IIR/SIBS/Iron blends at 0° C.;

FIG. 7 shows storage moduli plots of IIR/SIBS/Iron blends at −50° C.;

FIG. 8 shows tan delta plots of IIR/SIBS/Iron blends at −50° C.;

FIG. 9 shows a comparison of the storage moduli plots of existing less-lethal ammunition projectiles and SIBS50 at 50° C.;

FIG. 10 shows a comparison of the tan delta plots of existing less-lethal ammunition projectiles and SIBS50 at 50° C.;

FIG. 11 shows a comparison of the storage moduli plots of existing less-lethal ammunition projectiles and SIBS50 at 50° C.;

FIG. 12 shows a comparison of the tan delta plots of existing less-lethal ammunition projectiles and SIBS50 at 50° C.; and FIG. 13 shows a comparison of the dynamic stiffness plots of existing less-lethal ammunition projectiles and SIBS50.

TABLES

Figure 1A:
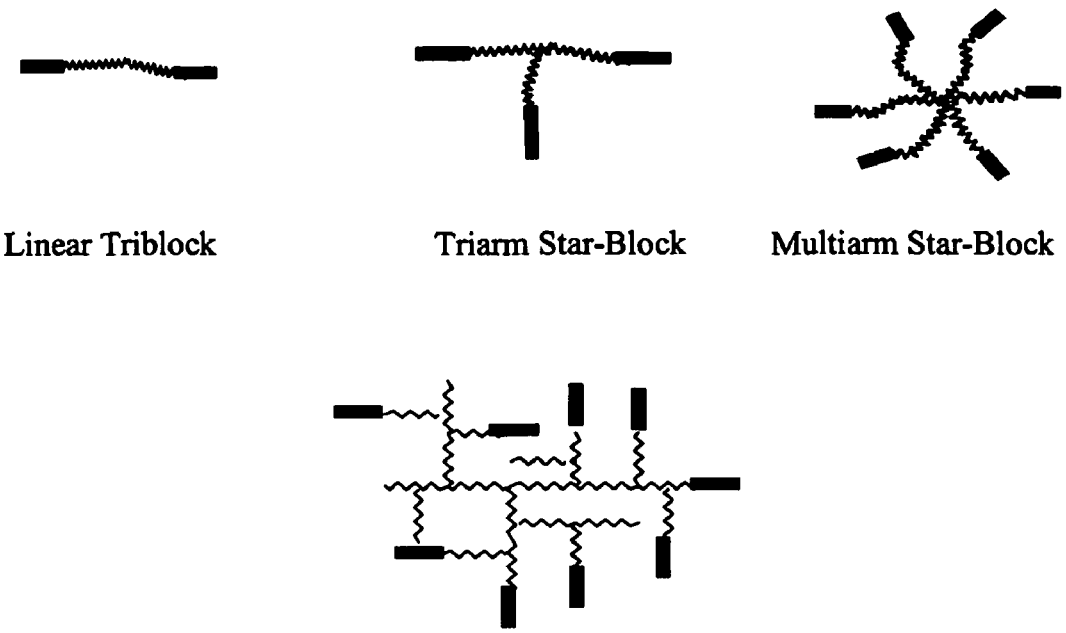
FIG. 1 shows the design of the new less-lethal projectile with tail for 12 and 20 gauge ammunition.

Table 1 shows composition, Shore A hardness and density of various IIR/SIBS/iron blends;

Table 2 shows accuracy and impact energy for the new 20-gauge less-lethal projectiles;

Table 3 shows accuracy and impact energy for 20-gauge sock-round less-lethal projectiles;

Table 4 shows accuracy and impact energy for the new 12-gauge less-lethal projectiles;

Table 5 shows accuracy and impact energy for 12-gauge sock-round less-lethal projectiles; and Table 6 shows accuracy tests for existing and new lethal ammunition projectiles.

DETAILED DESCRIPTION OF THE INVENTION AND PREFERRED EMBODIMENTS

Definitions

As used herein, the term "soft elastomeric polymer" means a polymer that at ambient temperatures is above its glass transition temperature. In other words, this material is one which at ambient temperatures is a viscous material having an amorphous structure. It is this component of the polymer matrix which is primarily responsible for the softness and high damping characteristics of the final composite.

As used herein, the term "thermoplastic elastomeric polymer (TPE)" means a thermoplastic polymer that at ambient temperatures exhibits a suitable degree of resilience and/or softness, but provides a thermolabile physical network so that the shape retention properties of the final polymer matrix are increased compared with those properties of the soft elastomeric polymer component alone. It is the thermoplastic nature of this second thermoplastic polymer component of the matrix of the composite which is primarily responsible for the shape retention and/or low compression creep properties of the final composite.

As used herein, the term "linear architecture" means a linear polymer chain.

As used herein, the term "star architecture" means a polymer having a core from which a number of arms (3-infinite or as many as possible to fill the space) emanate.

As used herein, the term "arborescent architecture" means a randomly branched structure resembling a tree (branches on branches).

As used herein, the term "comb architecture" means a linear polymer chain to which a number of shorter linear chains are attached, with the structure resembling a comb.

IIR is a commercial butyl elastomer, and SIBS is a commercial linear triblock polystyrene-polyisobutylene-polystyrene thermoplastic elastomer.

SBS means polystyrene-polybutadiene block copolymers.

SIS means polystyrene-polyisoprene block copolymers

SEBS and SEPS means the hydrogenated versions of SBS and SIS.

SEBS means polystyrene-poly(ethylene-butylene)-polystyrene.

SEPS means polystyrene-poly(ethylene-propylene)-polystyrene.

TPO means thermoplastic polyolefins.

TPV means dynamically vulcanized TPVs.

The above listed soft elastomer components and thermoplastic elastomer components can have various architectures (linear, star, arborescent, comb. etc).

Design Principles of the New Projectile

When designing the new projectiles, several considerations were taken into account. There are optimum material density requirements for any bullet, lethal or less-lethal. In addition, the propellant powders are intended to work with a projectile of a certain mass that provides a typical pressure vs. time curve. Using a lighter projectile causes many problems, the main one being too low energy transfer. Lighter projectiles have to be much faster to provide sufficient energy transfer, which requires a propellant powder that would burn faster. The combination of fast powders and lightweight projectiles can dangerously exceed recognized gun chamber pressure standards. In addition, if higher than desired linear velocity of a projectile is inherently coupled with higher than desired spin velocities, this results in poorer accuracy of the bullet. For projectiles, lower density almost invariably translates into poorer performance in terms of accuracy. With less dense materials, the bullet cannot be brought up to its desired weight by increasing its size due to the dimensional limitations imposed by the standard gun chambers into which the bullet must fit. A bullet that would require re-chambering the gun would not be acceptable to many gun owners because the weapon would no longer be optimal for standard ammunition.

Figure 1B:
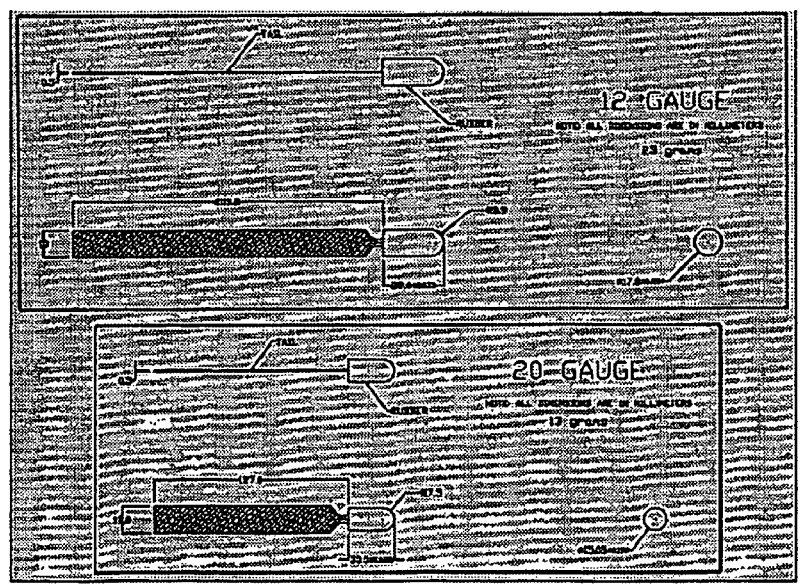

FIG. 1 shows the dimensions of the 12 and 20-gauge projectiles. In terms of impact, the most important design criterion is the maximum tolerable energy or force that an average human could withstand without serious injury. This is highly individual as it generally depends on the individual's body fat and muscle mass. Bir's study considered the average male (about 5 ft 10 in, 160 lb). Based on her results, the tolerable energy transfer at muzzle is 44 J 32 (ftlb) for the 20 gauge and 73 J (54 ftlb) for the 12-gauge projectile. The maximum allowable deflection of 6.93 mm and the maximum tolerable impact force without serious injury is limited to 3200 N. With the desirable 76 ms−1 (250 fts−1) muzzle velocity, this translates into about 15 g and 25 g mass for the 20 and 12-gauge projectiles, respectively. Thus the minimum density of the projectiles with the dimensions shown in FIG. (1) was calculated to be 2.4 gm-cm$^{-3}$.

The next criterion was the selection of materials that would yield the desired mechanical properties. Butyl elastomer (IIR) has outstanding low temperature properties and very high damping, but has very high creep without crosslinking (J. V. Fusco and P. House, in "Rubber Technology," M. Morton, Ed., Van Nostrand Reinhold Company, New York (1987). The inventors contemplated that a blend of novel polyisobutylene-based styrene-isobutylene-styrene SIBS TPE (J. P. Kennedy, J. E. Puskas, G. Kaszas, and W. G. Hager (to the University of Akron, U.S. Pat. No. 4,946,899, Aug. 7, 1990, and J. E. Puskas, C. Paulo, P. Antony, to UWO, U.S. Pat. No. 6,747,098, 2004), and butyl elastomer, filled to achieve the required minimum density of 2.4 g/cm$^{-3}$, would be a promising composite for less-lethal ammunition. TPEs, including SIBS, show processing behavior similar to that of thermoplastics and mechanical properties similar to that of thermoset elastomers or rubbers. Therefore they combine the advantages of low fabrication cost and recyclability with elasticity and softness (G. Holden and N. R. Legge, in "Thermoplastic Elastomers—A Comprehensive Review," G. Holden, N. R. Legge, R. Quirk, H. E. Schroeder (Eds.), Hanser Publishers, Munich (1996)).

Styrenic block-type thermoplastics elastomers (SBS and SIS) have been commercialized since the 1960s and are available in a wide range of hardness, depending on the rubber/plastic ratio. SIBS have been developed in the last decade and only recently have been commercialized. Preliminary testing demonstrated that SIBS with its inherent high damping properties due to the polyisobutylene segment would eminently be suitable for developing a composite for the novel less-lethal projectiles. Moreover, the exceptional low temperature properties of these block copolymers together with ease of processing and recyclability, make them suitable candidates for low temperature application. The SIBS would provide a "physically crosslinked network", thereby ensuring shape retention combined with recyclability. With the advent of macromolecular engineering, scientists gained control over polymerization processes and are able to produce various polymer architectures, shown in FIG. 1a.

Linear triblock SIBS TPEs are considered the first generation of these new materials and were introduced commercially in 2003 by Kaneka Co. of Japan, based on a license of U.S. Pat. No. 4,946,899, from the University of Akron. Star-branched SIBS is considered the second generation, with improved properties, and has not been commercialized yet. The third generation, arborescent (dendritic, tree-like) SIBS TPEs are disclosed in U.S. Pat. No. 6,747,098, 2004 issued to Puskas et al. Initial investigations of the mechanical and viscoelastic properties of these materials indicated superior properties (P. Antony, Y. Kwon, J. E. Puskas, M. Kovar, P. R. Norton, EUR. POLYM. J., 40, 149-157, (2003) and Y. Kwon, J. E. Puskas, A. Bhowmick, J. POLYM. SCI., CHEM., 43, 1811 (2005)). All of these SIBS-type TPEs can serve as "physical crosslinking agents" of the butyl (IIR) elastomer matrix of the current invention. Any type of commercial butyl elastomer can be used as the elastomeric component of the composite in the present invention.

In order to achieve the desired density of the composite, an appropriate filler is required. As stated earlier, the use of lead in the less-lethal market is not favourable, due to its environmental toxicity.

The present invention, and preferred embodiments of the various aspects thereof, will now be described in detail. The essence of the present invention lies in a special bi-component polymer matrix that provides the composite with desirable balance of physical properties, notably softness and compression creep and high damping property combination with required high density.

The polymer matrix of the composite of this invention comprises at least one soft elastomeric polymer component and at least one thermoplastic elastomeric polymer component. These composite materials have utility in applications requiring shape retention, and particularly, when combined with a filler as described above is very useful in producing polymer-based ammunition.

Suitable polymers for use in the invention as the soft elastomeric polymer component include polyisobutylene, polyisobutylene-isoprene copolymers, polyisobutylene-styrene copolymers, polyisobutylene-alkyl styrene copolymers, halogenated polyisobutylene-alkyl styrene terpolymers, polybutadiene, polyisoprene, polyethylene-propylene copolymers, polyethylene-propylene diene terpolymers.

Polyisobutylene, and polyisobutylene-isoprene copolymers, are particularly preferred. Selection of an optimum polymer may depend upon the exact mechanical properties required of it, which may depend to at least some extent on the amount of it to be incorporated in the polymer matrix and the relative physical properties of the elastomeric polymer component, and possibly any other components of the composite which are present, including the high specific gravity weight material dispersed therein. The above listed soft elastomer components and components can have various architectures (linear, star, arborescent, comb. etc) as shown in FIG. 1a.

Preferred thermoplastic elastomeric polymers for use in the polymer matrix are block copolymers comprising at least one elastomeric block. Examples of block copolymers of this type include polystyrene-polyisobutylene-polystyrene (SIBS), polystyrene-polybutadiene block copolymers, and polystyrene-polyisoprene block copolymers, the hydrogenated versions of these (polystyrene-poly(ethylene-butylene)-polystyrene, SEBS, and polystyrene-poly(ethylene-propylene)-polystyrene, (SEPS), thermoplastic polyolefins (TPOs), and dynamically vulcanized TPVs. The above listed soft elastomer components and thermoplastic elastomer components can have various architectures (linear, star, arborescent, comb etc).

The rigid thermoplastic polymer blocks of the matrix can have glass transition temperatures or order-disorder transition temperature up to 300° C. in case of chemically stable saturated elastomer blocks (SIBS, SEBS, SEPS, TPV, TPO). In case of chemically unsaturated elastomer TPE blocks (SIS, SBS) the glass transition temperature should be less than about 150° C. Polymers of these types are commercially available, for example as the KRATON (trade mark) series of polymers from Shell Chemical Company (for example the KRATON D and KRATON G ranges of polymers) and the Kaneka (trade mark) series of polymers (e.g. Kaneka SIBS 73T and Kaneka SIBS103T) from Kaneka Corporation, Osaka, Japan.

The high specific gravity weight material is present in the composite of the invention in particulate form and may be added to the polymer matrix during manufacture in the form of a powder or grains thereof. Small particles are preferred, for example having sizes in the range from about 71.4% of −100 to +325 U.S. Mesh and 23.2% of −325 U.S. Mesh, and a density of 7.8 gcm$^{-3}$. Within the above preferred criteria, therefore, any particulate high density material may be used as this component of the composite of the invention. One particularly preferred example of such a material which has been found to be useful in the invention is iron powder, which is non-toxic and itself has a very high density.

The choices of high specific gravity weight material metal powders include tungsten, copper, bismuth, iron and iron oxides. The Brinell Hardness for tungsten and copper is 2570 MNm$^{-2}$ and 874 MNm$^{-2}$, respectively, hence these may be too abrasive which may result in damage to the barrel of the gun in some applications. The Brinell Hardness of bismuth is 94.2 MNm$^{-2}$, but bismuth thus is expensive in comparison with iron. Iron oxide has a density of 5.24 g/cm$^3$, which may not be high enough for some less lethal ammunition applications. Iron powder has a density of 7.8 gm/cm$^3$ and Brinell Hardness of 490 MNm$^{-2}$ which makes it the most preferred high density material for use in the composites of the present invention. Therefore, while iron powder is preferred it will be understood other materials may be used as well.

The high specific gravity weight material will be present in an amount only sufficient for raising the density of the composite to the required value, and no more than this. A density of the final composite of at least about 2 to 3 gm-cm$^{-3}$, where 2.4 gm-cm$^{-3}$ is the preferred density. The amount of powdered iron (or other high density weight material) to be added to the basic polymer blend matrix to achieve this value is a simple matter of calculation or trial and error. Typically, however, the high density weight material may be present in the final composite in an amount of from about 50 to about 90% by volume of the total composite, preferably from about 60 to about 80% by volume, more preferably from about 60 to about 70% by volume, the balance being the polymer matrix.

The composition of the polymer blend matrix, however, is more critical in terms of the balance of physical properties of the individual components, as in order to achieve optimum hardness, strength, compression creep, it is generally important that the content of the softer, elastomeric component is not too high or too low compared with the content of the harder thermoplastic elastomeric polymer component.

The polymer matrix of the composite of the invention preferably comprises the soft elastomeric polymer component in an amount within the range from about 25 to about 90% by weight of the polymer matrix, more preferably from about 40 to about 60% by weight, and the thermoplastic elastomeric polymer component in an amount within the range from about 10 to about 75% by weight, more preferably from about 60 to about 40% by weight.

Preferably the high density composite of the invention has a hardness value, as measured according to the Shore A scale, in the range of from about 30 to about 55. A hardness of less than about 30 Shore A gives a product which is generally too soft for applications such as shot or bullets for firearms, where the projectile would tend have compression creep higher then 20% which makes them unsuitable as they have higher probability of getting stuck in the barrel.

The composite of the present invention may be manufactured by conventional methods well known in polymer technology, as are well known to the person skilled in the art and well described in the literature. For example, the rigid thermoplastic elastomeric polymer and soft elastomeric polymer components are heated to above their glass transition temperature and one of these components is added to the other with mixing in a standard type of mixer until the TPEs are not completely homogeneous even in the molten state optionally with further heating if necessary. Once the matrix is fully mixed and while the mixture is still in its molten or at least soft state, the high specific gravity particulate material is added, with further mixing in order to evenly disperse the particles in the matrix. Mixing may be continued until complete dispersion is achieved, following which the composite may be cooled and passed to the next processing stage, which is preferably the formation of discrete bodies of the composite by molding, for example injection molding or compression molding.

The present invention will be further illustrated by the following Examples, which are not to be construed as limiting the scope of the present invention in any way.

Example 1

Butyl elastomer (IIR, grade RB301, unsaturation=1.6 mole %, Mooney viscosity $ML_{1+8}$=125° C.=51) which is a commercial elastomer, known in the art and iron oxide powder ($Fe_2O_3$, 20 mesh from Ironics) in 30:70 weight ratio were mixed in a laboratory internal mixer (Haake Rheocord model "Rheomix 3000") with cam type rotors operating at 35 rpm at an initial temperature of 160° C. The temperature was maintained at 160±10° C. by using an air-cooling system. The density of the composite was 1.51 g/cm$^{-3}$, less than the desired density of 2.40 gcm$^{-3}$. At this density, the weight of the projectile will be less than required hence not suitable for use in less lethal ammunition. In this example, TPE was not used, this example being to illustrate the role of the filler, since butyl and SIBS have about the same density.

Example 2

Iron powder (Atomet 67, Quebec Metal Powders) and butyl elastomer (grade RB301) in 70:30 weight ratio were mixed into a composite in a laboratory internal mixer (Haake Rheocord model "Rheomix 3000") with cam type rotors operating at 35 rpm at an initial temperature of 160° C. The temperature was maintained at 160±10° C. by using an air-cooling system. The Shore A hardness of this composite, hereafter referred to as IIR (see Table 1), determined according to ASTM standard D2240, was 18.6 and its density was 2.40 g/cm$^3$, sufficient for the less lethal ammunition projectiles shown in FIG. 1 which shows the design of the new projectile with tail for 12 and 20 gauge ammunition.

The compression creep of IIR determined by DEFO with 75 Newton load and at 40° C., was 32% (FIG. 2). The formulation in this example has no TPE since this example is to illustrate that the density required can be obtained.

Compression creep data provides information on the ability of the material to maintain its shape. High creep means high permanent deformation. A thermoset (crosslinked) rubber typically has about 5% creep, corresponding to excellent ability to maintain the shape of the article. A typical thermoplastic elastomer has somewhat higher creep (10-15%), still associated with good shape retention. Materials with creep higher than 20% would have poor shape retention. (J. V. Fusco and P. House, in "Rubber Technology," M. Morton, Ed., Van Nostrand Reinhold Company, New York (1987)). Thus, polymer-based ammunition can be produced having a dynamic mechanical compression creep below a threshold creep so that the polymer-based ammunition maintains its shape for a pre-selected period of time. The threshold creep is preferably about 20%. By selection of the compositions of the different constituents, materials can be produced to retain their shape for a pre-selected period of time, for example a preferred composition can be produced which does not change more than 10% for at least a year.

Example 3

Example 2 is repeated, with the following modifications. Iron powder (Atomet 67), butyl elastomer (grade RB301) and polyisobutylene-polystyrene block co-polymer (Kaneka grade SIBS073T) in weight ratios (iron:elastomer:block co-polymer, 70:22.5:7.5) were mixed into a composite material. The Shore A hardness of this composite, hereafter referred as SIBS25, determined according to ASTM standard D2240, was 23 and the density was 2.42 gcm$^{-3}$. The compression creep of SIBS25 determined by DEFO, at a load of 75 Newton and 40° C. was 22% (FIG. 2).

Example 4

Example 2 is repeated, with the following modifications. Iron powder (Atomet 67), butyl elastomer (grade RB301) and polyisobutylene-polystyrene block co-polymer (Kaneka grade SIBS073T) in weight ratios (iron:elastomer:block co-polymer, 70:15:15) were mixed into a composite material. The Shore A hardness of the composite, hereafter referred as SIBS50, determined according to ASTM standard D2240, was 36 and its density was 2.44 g/cm$^2$. The dynamic mechanical compression creep of SIBS50 determined by DEFO, at a load of 75 Newton and 40° C. was 12% (FIG. 2).

Example 5

Example 2 is repeated, with the following modifications. Iron powder (Atomet 67), butyl elastomer (grade RB301) and polyisobutylene-polystyrene block co-polymer (Kaneka grade SIBS073T) in weight ratios (iron:elastomer:block co-polymer, 70:7.5:22.5) were mixed into a composite material. The Shore A hardness of the composite, hereafter referred as SIBS75, determined according to ASTM standard D2240, was 44.0 and the density was 2.46 g/cm$^2$. The dynamic mechanical compression creep of SIBS75 determined by DEFO, at a load of 75 Newton and 40° C. was 11% (FIG. 2).

Example 6

Example 2 is repeated, with following modifications. Iron powder (Atomet 67) and polyisobutylene-polystyrene block co-polymer (Kaneka grade SIBS073T) in weight ratios (iron:block co-polymer, 70:30) were mixed into a composite material. The Shore A hardness of the composite, hereafter referred as SIBS100, determined according to ASTM standard D2240, was 53.3 and the density was 2.49 g/cm$^2$. The dynamic mechanical compression creep of SIBS100 determined by DEFO, at a load of 75 Newton and 40° C. was 4% (see FIG. 2).

Example 7

Dynamic Mechanical Analysis studies were conducted for IIR, SIBS50, SIBS75 and SIBS100. SIBS25 was not included, since it showed excessive creep (see Example 2). The MTS 831 Elastomer Test System, by MTS Systems Corporation U.S.A., was employed for dynamic characterization of the composites in the frequency range of 0.01 to 500 Hz. The analysis was carried out on compression molded cylindrical specimens (diameter, 10 mm and height, 10 mm). The DMTA analysis examines the temperature and frequency dependent behavior of materials. In DMTA analysis, application of a stress imposes a deformation, or in other words, a small strain and the resultant stress developed on the material is measured, which in turn provides the stiffness and damping property of the material. This analysis produces sample environments that mimic end use conditions of the materials tested. The analysis is used for design criteria, quality assurance, comparative investigations and product development/optimization.

FIGS. 3 and 4 show the results of dynamic mechanical analysis at 50° C. The storage modulus of the material refers to its elastic behavior, which would have significance in its impact properties. The storage modulus (E') gradually increased with frequency for all composites (FIG. 3). The plots of SIBS50 and SIBS75 run close and somewhat above the plot of IIR, but both of them are considerably lower than the SIBS composite in the whole frequency range, with the difference increasing at higher frequencies. At higher frequencies, there is no considerable flow of polymer chains within the short period of oscillation and the material behaves like a glassy solid, hence an increase in E' with frequency is observed. All the elastomeric composites showed more or less same tan delta (FIG. 4) at higher frequencies, but the IIR composite showed higher tan delta at lower frequencies. The tan delta increase of the composites at high frequency could be due to partial breakdown in the physical cross-links.

In the previous Example 3 it has been shown that incorporation of SIBS polymer to the composite is essential for the shape retention of the less lethal ammunition. In addition to this incorporation of SIBS thermoplastic elastomer also increases the modulus of the composite. If the bullet made from polymer-metal has modulus higher than the desired value, it would be hard and would impart higher energy to the target and can become lethal. Whereas, if the modulus of the composite is less then desired, the less lethal projectile made out of it would become ineffective. With addition of SIBS thermoplastic elastomer the shape retention property and the modulus of the polymer-metal composite can be simultaneously optimized as per requirement and the polymer-metal composite can be used for making a less lethal ammunition.

Example 8

Dynamic Mechanical Analysis was carried out at 0° C. (FIGS. 5 and 6). E' slightly increased below 1 Hz, followed by a rapid increase and leveling off at about 100 Hz (FIG. 5). At 0° C. and higher frequencies, there is no flow of polymer chains within the short period of oscillation hence the modulus increases with frequency. All the elastomeric composites had more or less same tan delta (FIG. 6), which gradually increased in the higher frequency range (1-500 Hz). This again could be due to the partial breakdown in the physical cross-links.

Example 9

Dynamic Mechanical Analysis was carried out at −50° C. (FIGS. 7 and 8). The storage modulus plot of the SIBS50 composite was very close to the plot of IIR, with SIBS75 and SIBS100 showing higher moduli in the entire range (FIG. 7). The tan delta plots of all composites run close to each other (FIG. 8), decreasing up till about 10 Hz and leveling off in the higher frequency range.

In summary, these results show that IIR and SIBS25 have low Shore A Hardness (Table I), but display high compression creep behavior. SIBS75 had almost the same compression creep as SIBS50 composite but had higher Shore A Hardness and moduli. SIBS100 had lower compression creep and higher Shore A Hardness than the other composite mixes. Based on this analysis the SIBS50 (IIR/SIB/Iron 50/50/233) seems to have optimum hardness, compression creep and dynamic mechanical properties for less-lethal ammunition projectile application.

Example 10

Comparative dynamic mechanical analysis between different existing less lethal ammunition and the newly developed less lethal ammunition was carried out with the MTS instrument, at a dynamic load of 1% strain in a frequency range of 0.15 to 500 Hz at 50° C. and 0° C. (FIGS. 9-12). At 50° C., SIBS50 showed lower modulus compared to rocket, tube and mono-ball projectiles (FIG. 9). The tan delta of SIBS50 was lower than that of the rocket projectile and the tube projectile but slightly higher than the mono-ball projectile up to about a 100 Hz, beyond which both of the mono-ball and SIBS50 showed increasing but similar tan delta values (FIG. 10). At 0° C., the E' plot of SIBS50 runs below the plots of the rocket projectile and the tube projectile, and close to that of the mono-ball projectile until about 10 Hz (FIG. 11). In the higher frequency range (10-500 Hz), the modulus of SIBS50 showed a sharp increase, reaching the values of the rocket projectile. The tan delta (FIG. 12) of the new less-lethal ammunition projectile was somewhat lower than the rocket and tube projectiles, but higher than the mono-ball, up to about 10 Hz, when it started to increase, surpassing the existing projectiles. This indicates very good low temperature properties in the high frequency range.

At −50° C., it was not possible to perform dynamic mechanical analysis for rocket and tube projectiles since their modulus exceeded the force limit of the load cell of the instrument. The dynamic mechanical analysis in the temperature range of 50-0° C., indicates that at higher frequencies the new projectile has lower modulus, indicating lower hardness and higher tan delta, with better damping properties than the existing rocket and tube projectiles.

Example 11

Less-lethal projectiles produced in accordance with the present invention were fired at a velocity of about 250 ft/s (~75 m/s), thus the estimated frequency range of 12% deformation upon impact is about 16,000 to 21,000 Hz (~102,000 to 132,000 rad/s). Stiffness analysis in a wide frequency range (dynamic stiffness) with the application of the Time-Temperature Superposition (TTS) principle, a method well known in the art of polymer rheology, was used to compare the performance of various less lethal projectiles. FIG. 13 shows the plots, with the firing frequency range marked. Above 102 rad/sec, the SIBS50 showed much lower stiffness than the commercial less lethal ammunition—within the estimated firing frequency range the difference is 2-3 orders of magnitude. Therefore, the new SIBS/IIR composite is expected to have superior performance compared to existing less lethal ammunition.

Example 12

New Method for Comparative Impact Testing

The composite SIBS50 offers the most advantages in terms of compression creep properties (11% DEFO) and hardness (36 Shore A). A comparative impact testing of the new less lethal ammunition projectile developed using SIBS50 (described in Example 4) was carried out using a novel DOW Styrofoam Impactor. The Impactor arrangement consists of polystyrene foam sheets (commercially named Styrofoam SM made by DOW. It is a viscoelastic material allowing for penetration of rubber projectiles. Four 2'×2'×2"-sheets are placed upright and strapped tightly to insure a proper hold. The stack of sheets is then placed against a fixed surface such as a brick wall to prevent tumbling. Current tests show that at 15-feet firing distance from the muzzle and 300±15 ft/sec muzzle velocity (measured using a Doppler Radar) results in a penetration of about 6 inches in the foam. Impact Energy transfer is then calculated as a function of the projectile's penetration in the foam by the following equation:

$$\text{Impact Energy (J)} = A \times Lp \times \text{Compressive Strength (0.21 MPa)}$$

Where:

$A$=projectile's impact cross sectional area.

$Lp$=length of projectile penetration in the foam.

The accuracy and the impact energy of less-lethal projectile made of SIBS50 were compared with sock rounds for 12-gauge and 20-gauge projectiles; Tables 2-5 summarize the results. The sock round was selected for this comparative test since it is the most widely used less lethal projectile in market and has proven to be the best of all existing less lethal projectiles, despite of being associated with some serious injuries to human targets. The calculated impact energies were compared with the impact energy corridors proposed by Bir. The clay impactor set-up used by Bir requires significant conditioning at a very narrow temperature and humidity range, thus its use is rather cumbersome. We tested the projectiles using the novel Styrofoam impactor introduced here. Styrofoam is an insulating hydrophobic viscoelastic material that maintains constant mechanical properties over a broader range of temperatures and humidity.

Tables 2 and 3 summarize test results for the 20-gauge less-lethal projectiles. The projectile distance from center of target was 9.30±2.00 cm with an average velocity of 84±5.27 ms−1 for the new projectile, and 7.24±3.28 cm with an average velocity of 91.91±7.17 ms−1 for the sock round. One of the main factors in judging the performance of less-lethal projectiles is its velocity consistency. A velocity deviation less then 10% is regarded excellent when using less-lethal projectiles. The velocity deviation for the newly developed 20-gauge projectile was about 6.3%, in comparison with about 7.8% for the sock round. The second main factor is the impact area of the projectile. Both the newly developed 20-gauge projectiles and the sock rounds impacted in the 10.16 cm (4 in) diameter circle from about 5 m (15 feet), but the sock rounds showed much higher standard deviation. In addition, it was observed during this test that some of the sock rounds failed to open up upon launching and ended up hitting the foam Impactor while still folded.

Under optimum conditions, a sock round must open within 2 m of launching in order to allow for a higher air resistance and therefore slow down in order to transfer less energy before hitting the target. In the case of the 12-gauge projectiles, tests were carried out from a common police and military firing distance of 10.7 m (−35 ft) using a standard 12-gauge shotgun. Tables 4 and 5 summarize test results. The velocity deviation computed to about 4% and 7% and the projectiles impacted in the 10.16 cm (4 in) diameter circle. These results are excellent in terms of velocity consistency, but the accuracy became poorer for both the new projectiles and the sock rounds. The new Styrofoam Impactor employed for measuring the impact energy of the less-lethal projectiles yielded favorable results in comparison to the comprehensive study conducted by Bir who employed the Abbreviated Injury Score (AIS), a scale developed in the 1960s to standardize the severity of injuries such as blunt thoracic impact. An AIS value of 0 is equivalent to a minor injury and 6 is equivalent to untreatable injury. It was noted, however, that injuries with an AIS of 3 or larger result in a high probability of death. For example, an injury of lung contusion with hemomediastinum is considered an AIS 4 injury. Using this scale to evaluate the injuries of the 37 mm ammunitions she tested on human cadaver specimens resulted in the development of tolerable force-time corridors and tolerable deflection-time corridors. The tolerable force corridor for a 37 mm projectile weighing 30 g and traveling at 60 ms$^{-1}$ with an impact time of 0.275 ms was between 1800 to 3700 N, which can be translated into an impact energy range of 2.57 to 25.64 J. Under these conditions the average muzzle energy was observed to be approximately 54 J. These data corresponds to an AIS injury of less than 3.

As shown in Table 2 the average impact energy for the newly developed 20-gauge less-lethal projectile was 8.84±1.70 J at a muzzle energy of about 47.71±5.97 J. This impact energy value is closer to the lower boundary set by Bir's actual cadaver testing. For the sock rounds, the average impact energy was 21.88±1.65 J at a muzzle energy of about 140.96±25.15 J (Table 3). This impact energy is closer to the upper boundary set by Bir's actual cadaver testing. This implies that sock rounds may cause serious injuries if projectiles are fired from shorter distances.

The 12-gauge rounds were fired from a shotgun with more muzzle energy to compensate for the longer distances they travel before impacting the target. They also weigh more than the 20-gauge rounds. The 23 g 12-gauge new less-lethal projectile leave the muzzle with 89.12±7.19 J energy to impact with 12.32±3.08 J energy from approximately a 10 m distance (Table 4). The impact energy here is still near the lower boundary limits published by Bir.

The 12-gauge sock round with 119.07±16.14 J of muzzle energy had an impact energy of 22.75±1.94 J (Table 5). This was slightly higher then the upper boundary limit, i.e., 25.64 J, set by Bir. With this type of energy transfer, there is greater probability of causing serious injuries to human targets. In summary, the newly developed less lethal projectiles performed well in comparison with the most frequently used sock rounds in terms of accuracy and velocity consistency, while delivering impact energies close to the lower boundary of the tolerable energy corridors developed by Bir. The impact energy delivered by the sock rounds was closer to the upper limit, with the 12-gauge round surpassing the limit.

Example 13

A comparative accuracy testing of the new less lethal ammunition projectile developed using SIBS50 (described in Example 4) with existing less lethal ammunition was carried out. In this test, accuracy of several existing ammunition was measured using various weapon systems. For the Rocket and triple ball projectile, a 12-gauge shotgun was used, for the Mono Ball projectile a 37 mm launcher was employed and a 20-gauge handgun was used for the new projectiles. Firing of all projectiles was conducted at a distance of approximately 15 Feet. Table 6 summarizes the results.

The new less lethal projectiles disclosed herein performed well in comparison with the most frequently used sock rounds in terms of accuracy and velocity consistency, while delivering impact energies close to the lower boundary of the tolerable energy corridors developed by Bir. The impact energy delivered by the sock rounds was closer to the upper limit, with the 12-gauge round surpassing the limit. The results were verified by tests with the three-rib impactor of Bir validated against cadaver testing (C. A. Bir, D. C. Vino, and A. I. King, "Evaluation of Blunt ballistic impacts: The establishment of human response corridors," Proceedings of the Non-lethal Conference IV, Tysons Corner, Va. (2000); C. A. Bir: Ph. D. Thesis, Wayne State University (2000).

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

TABLE 1

COMPOSITION, SHORE A HARDNESS AND DENSITY OF VARIOUS IIR/SIBS/IRON BLENDS

| | Blend designation | | | | |
|---|---|---|---|---|---|
| Ingredients[a] | IIR | SIBS25 | SIBS50 | SIBS75 | SIBS100 |
| IIR | 100 | 75 | 50 | 25 | 0 |
| SIBS | 0 | 25 | 50 | 75 | 100 |
| Iron powder | 233 | 233 | 233 | 233 | 233 |
| Compression Creep, % | 32 | 22 | 12 | 11 | 4 |
| Shore A Hardness | 19 | 23 | 36 | 44 | 53 |
| Density, gcm$^{-3}$ | 2.40 | 2.42 | 2.44 | 2.46 | 2.49 |

[a]Compositions are in part per weight

TABLE 2

Accuracy and impact energy for the new 20-gauge less-lethal projectiles.

| Sample # | Distance from center of target, cm. | Mass, kg.[b] | Velocity, $ms^{-1}$. | Penetration, m. | Impact Energy, J. | Muzzle Energy, J. |
|---|---|---|---|---|---|---|
| 1 | 12.7 | 0.0137 | 92.05 | 0.089 | 7.29 | 58.04 |
| 2 | 10.16 | 0.0133 | 83.19 | 0.114 | 9.37 | 46.02 |
| 3 | 8.89 | 0.0138 | 84.30 | 0.127 | 10.41 | 49.03 |
| 4 | 8.89 | 0.0127 | 86.87 | 0.102 | 8.33 | 47.92 |
| 5 | 10.16 | 0.0138 | 85.34 | 0.089 | 7.29 | 50.26 |
| 6 | 8.89 | 0.0131 | 89.00 | 0.152 | 12.50 | 51.88 |
| 7 | 10.16 | 0.0134 | 73.46 | 0.094 | 7.71 | 36.15 |
| 8 | 5.08 | 0.0132 | 81.69 | 0.102 | 8.33 | 44.04 |
| 9 | 8.89 | 0.0138 | 81.69 | 0.102 | 8.33 | 46.04 |
| Average | 9.31 | 0.0134 | 84.18 | 0.108 | 8.84 | 47.71 |
| Standard Deviation, %. | 21.6 | 3.0 | 6.3 | 19.4 | 19.2 | 12.5 |

[b]Includes the weight of the tail.

TABLE 3

Accuracy and impact energy for the 20-gauge sock rounds.

| Sample # | Distance from center of target, cm. | Mass, kg.[b] | Velocity, $ms^{-1}$. | Penetration, m. | Impact Energy, J. | Muzzle Energy, J. |
|---|---|---|---|---|---|---|
| 1 | 11.43 | 0.0324 | 85.65 | 0.191 | 24.41 | 118.84 |
| 2 | 5.08 | 0.0329 | 87.17 | 0.178 | 22.78 | 125.01 |
| 3 | 7.62 | 0.0329 | 91.74 | 0.178 | 22.78 | 138.46 |
| 4 | 11.43 | 0.0322 | 86.26 | 0.152 | 19.53 | 119.79 |
| 5 | 8.89 | 0.0319 | 91.44 | 0.152 | 19.53 | 133.36 |
| 6 | 1.27 | 0.0331 | 91.91 | 0.165 | 21.15 | 139.82 |
| 7 | 6.35 | 0.0334 | 110.95 | 0.178 | 22.78 | 205.56 |
| 8 | 10.16 | 0.0322 | 92.66 | 0.165 | 21.15 | 138.23 |
| 9 | 5.08 | 0.0326 | 91.74 | 0.178 | 22.78 | 137.30 |
| 10 | 5.08 | 0.0327 | 89.61 | 0.203 | 22.29 | 131.11 |
| Average | 7.24 | 0.0326 | 92.61 | 0.174 | 21.88 | 140.96 |
| Standard Deviation, %. | 45.3 | 1.5 | 7.8 | 9.2 | 7.54 | 17.8 |

[b]Includes the weight of the tail.

TABLE 4

Accuracy and impact energy for the new 12-gauge less-lethal projectiles.

| Sample # | Distance from center of target, cm. | Mass, kg.[b] | Velocity, $ms^{-1}$. | Penetration, m. | Impact Energy, J. | Muzzle Energy, J. |
|---|---|---|---|---|---|---|
| 1 | 10.16 | 0.024 | 85.04 | 0.051 | 6.51 | 86.78 |
| 2 | 7.62 | 0.024 | 81.08 | 0.1016 | 13.02 | 78.88 |
| 3 | 7.62 | 0.024 | 85.95 | 0.102 | 13.02 | 88.66 |
| 4 | 7.62 | 0.024 | 90.83 | 0.102 | 13.02 | 99.00 |
| 5 | 6.35 | 0.024 | 91.44 | 0.140 | 17.90 | 100.34 |
| 6 | 1.27 | 0.024 | 87.78 | 0.064 | 8.14 | 92.47 |
| 7 | 2.54 | 0.024 | 81.99 | 0.102 | 13.02 | 80.67 |
| 8 | 10.16 | 0.024 | 86.56 | 0.102 | 13.02 | 89.92 |
| 9 | 10.16 | 0.024 | 87.78 | 0.102 | 13.02 | 92.47 |
| 10 | 10.16 | 0.024 | 83.21 | 0.114 | 12.53 | 83.09 |
| Average | 7.37 | 0.024 | 86.17 | 0.098 | 12.32 | 89.23 |
| Standard Deviation, %. | 43.6 | . . . | 4.0 | 25.6 | 25 | 8.1 |

[b]Includes the weight of the tail.

TABLE 5

Accuracy and impact energy for the 12-gauge sock rounds.

| Sample # | Distance from center of target, cm. | Mass, kg.[b] | Velocity, $ms^{-1}$. | Penetration, m. | Impact Energy, J. | Muzzle Energy, J. |
|---|---|---|---|---|---|---|
| 1 | 7.62 | 0.045 | 74.98 | 0.127 | 23.43 | 126.50 |
| 2 | 7.62 | 0.045 | 79.55 | 0.127 | 23.43 | 142.39 |
| 3 | 7.62 | 0.045 | 66.75 | 0.114 | 21.09 | 100.25 |
| 4 | 5.08 | 0.045 | 77.42 | 0.114 | 21.09 | 134.86 |
| 5 | 5.08 | 0.045 | 72.54 | 0.140 | 25.77 | 118.40 |
| 6 | 5.08 | 0.045 | 72.59 | 0.114 | 21.09 | 118.55 |
| 7 | 17.78 | 0.045 | 72.59 | 0.114 | 21.09 | 118.55 |
| 8 | 11.43 | 0.045 | 72.59 | 0.114 | 21.09 | 118.55 |
| 9 | 7.62 | 0.045 | 61.87 | 0.140 | 25.77 | 86.14 |
| 10 | 8.89 | 0.045 | 74.98 | 0.178 | 23.66 | 126.50 |
| Average | 8.38 | 0.045 | 72.59 | 0.128 | 22.75 | 119.07 |
| Standard Deviation, %. | 45.8 | . . . | 7.0 | 15.6 | 8.5 | 13.6 |

[b]Includes the weight of the tail

Therefore what is claimed is:

1. A polymer-based ammunition, comprising:
a composite material including
a polymer matrix including at least one thermoplastic elastomeric polymer (TPE) component, and at least one soft elastomeric polymer component that at ambient temperatures is above its glass transition temperature;
particles of a sufficiently high specific gravity material that are dispersed in the polymer matrix and present in an amount such that the composite material has a specific gravity of in a range from about 2 to 3; and
the composite material having a shape of a pre-selected projectile.

2. The polymer-based ammunition according to claim 1 wherein the thermoplastic elastomeric polymer (TPE) component comprises a block copolymer having at least one elastomeric block.

3. The polymer-based ammunition according to claim 2 wherein the thermoplastic elastomeric polymer (TPE) component is selected from the group consisting of polystyrene-polyisobutylene block copolymers, polystyrene-polybutadiene block copolymers, polystyrene-polyisoprene block copolymers, polystyrene-poly(ethylene-butylene) block copolymers, polystyrene-poly(ethylene-propylene) block copolymers, thermoplastic polyolefins (TPOs), and dynamically vulcanized TPVs.

4. The polymer-based ammunition according to claim 1, wherein the thermoplastic elastomeric polymer (TPE) component has a structure selected from the group consisting of linear, star, arborescent, comb, brush, centipede, hyperbranched, and dendritic.

5. The polymer-based ammunition according to claim 1, wherein the elastomeric polymer component is selected from the group consisting of polyisobutylene, polyisobutylene-isoprene copolymers, polyisobutylene-styrene copolymers, polyisobutylene-alkyl styrene copolymers, halogenated polyisobutylene-alkyl styrene terpolymers, polybutadiene, polyisoprene, polyethylene-propylene copolymers, polyethylene-propylene diene terpolymers.

6. The polymer-based ammunition according to claim 1, wherein the elastomeric polymer component is polyisobutylene, and wherein the thermoplastic elastomeric polymer (TPE) component is polystyrene-polyisobutylene-polystyrene (SIBS).

7. The polymer-based ammunition according to claim 1, wherein the elastomeric polymer component is a polyisobutylene-isoprene copolymer, and wherein the thermoplastic elastomeric polymer (TPE) component is polystyrene-polyisobutylene-polystyrene (SIBS).

8. The polymer-based ammunition according to claim 1, wherein the elastomeric polymer component is present in an amount from about 10% to about 90% by weight of the polymer matrix, and wherein the thermoplastic elastomeric polymer component is present in an amount from about 90 to about 10% by weight of the polymer matrix.

9. The polymer-based ammunition according to claim 1, wherein the elastomeric polymer component is present in an amount from about 40% to about 60% by weight of the polymer matrix, and wherein the thermoplastic elastomeric polymer component is present in an amount from about 60 to about 40% by weight of the polymer matrix.

10. The polymer-based ammunition according to claim 5 wherein the elastomeric polymer component has a structure selected from the group consisting of linear, star, arborescent, comb, brush, centipede, hyperbranched and dendritic.

11. The polymer-based ammunition according to claim 1, wherein the specific gravity of the composite material is at least about 2.44.

12. The polymer-based ammunition according to claim 1, wherein the high specific gravity material is present in the composite material in an amount of from about 50 to about 90% by volume of the total composite.

13. The polymer-based ammunition according to claim 1, wherein the high specific gravity material is present in the composite material in an amount of from about 60 to about 80% by volume of the total composite.

14. The polymer-based ammunition according to claim 1, wherein the high specific gravity material is present in the composite material in an amount of from about 10 to about 90% by volume of the total composite.

15. The polymer-based ammunition according to claim 1 wherein the composite material has a cylindrical or spherical shape.

16. The polymer-based ammunition according to claim 1 having a hardness value, as measured according to the Shore A scale, in a range of from about 15 to about 80.

17. The polymer-based ammunition according to claim 1 having a hardness value, as measured according to the Shore A scale, in a range of from about 30 to about 55.

18. The polymer-based ammunition according to claim 1 wherein the particles of a high specific gravity material are selected from the group consisting of iron powder, tungsten, copper, bismuth, and iron oxide.

19. The polymer-based ammunition according to claim 1 wherein the particles of a high specific gravity material are iron powder particles.

20. The polymer-based ammunition according to claim 19 wherein the iron powder particles have sizes in a range from about 71.4% of −100 to +325 U.S. Mesh and 23.2% of −325 U.S. Mesh, specific gravity, 7.

21. The polymer-based ammunition according to claim 1 produced by molding the composite material into any one of a cylindrical or spherical shape.

22. The polymer-based ammunition according to claim 21 wherein the step of molding is one of injection molding and compression molding.

23. The polymer-based ammunition according to claim 1 wherein the composite material has a dynamic mechanical compression creep below a threshold creep so that the polymer-based ammunition maintains its shape.

24. The polymer-based ammunition according to any one of claim 23 wherein said threshold dynamic mechanical compression creep is about 20%.

25. The polymer-based ammunition according to claim 23 wherein dimensions of the composite material do not change more than 10% for at least a year.

26. The polymer-based ammunition according to claim 1 wherein the composite material has a dynamic mechanical compression creep between 4 and 20% creep.

* * * * *